United States Patent
Goedegebuure

(10) Patent No.: US 10,120,849 B2
(45) Date of Patent: *Nov. 6, 2018

(54) DOCUMENT GENERATION BASED ON REFERRAL

(71) Applicant: eBay Inc., San Jose, CA (US)

(72) Inventor: Dennis Goedegebuure, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/497,566

(22) Filed: Apr. 26, 2017

(65) Prior Publication Data

US 2017/0228354 A1  Aug. 10, 2017

Related U.S. Application Data

(63) Continuation of application No. 14/608,112, filed on Jan. 28, 2015, now Pat. No. 9,639,509, which is a (Continued)

(51) Int. Cl.
*G06F 17/00* (2006.01)
*G06F 17/22* (2006.01)
(Continued)

(52) U.S. Cl.
CPC ...... *G06F 17/2288* (2013.01); *G06F 17/2247* (2013.01); *G06F 17/30011* (2013.01);
(Continued)

(58) Field of Classification Search
CPC .......... G06F 17/3089; G06F 17/30864; G06F 17/30867; G06F 17/30011; G06F 11/0757;
(Continued)

(56) References Cited

U.S. PATENT DOCUMENTS 6,578,078 B1  6/2003  Smith et al.
8,966,358 B2  2/2015  Goedegebuure
(Continued)

OTHER PUBLICATIONS

"U.S. Appl. No. 13/118,785, Advisory Action dated Aug. 29, 2013", 3 pgs.
(Continued)

*Primary Examiner* — Quoc A Tran
(74) *Attorney, Agent, or Firm* — Shook, Hardy & Bacon L.L.P.

(57) ABSTRACT

A document machine may detect a request for provision of a document while that document is available for provisioning. The document machine may update a count of referrals to the document and, based on the count of referrals transgressing a threshold value, generate a substitute document based on the original document. This substitute document may then be provided in response to further requests for the original document after the original document is no longer available for provision. The updating of the count of referrals is based on the identifier of a network that referred a request detected while the first document was still available for provision. The document machine may then provide the substitute document in lieu of the original document in response to a further request for provision of the first document.

20 Claims, 12 Drawing Sheets

Related U.S. Application Data continuation of application No. 13/118,785, filed on May 31, 2011, now Pat. No. 8,966,358.

(51) Int. Cl.
| | | |
|---|---|---|
| *G06F 17/30* | (2006.01) | |
| *G06Q 30/06* | (2012.01) | |
| *G06Q 30/02* | (2012.01) | |
| *G06F 11/07* | (2006.01) | |

(52) U.S. Cl.
CPC ...... *G06Q 30/0623* (2013.01); *G06F 11/0757* (2013.01); *G06F 17/3023* (2013.01); *G06F 17/3089* (2013.01); *G06F 17/30864* (2013.01); *G06F 17/30867* (2013.01); *G06Q 30/02* (2013.01); *G06Q 30/0203* (2013.01); *G06Q 30/0214* (2013.01); *G06Q 30/06* (2013.01)

(58) Field of Classification Search
CPC ...... G06F 3/0864; G06Q 30/02; G06Q 30/06; G06Q 30/0203; G06Q 30/0214
See application file for complete search history.

(56) References Cited

U.S. PATENT DOCUMENTS

| | | | |
|---|---|---|---|
| 9,639,509 B2 | 5/2017 | Goedegebuure | |
| 2005/0015512 A1 | 1/2005 | Kale et al. | |
| 2006/0010134 A1 | 1/2006 | Davis et al. | |
| 2006/0026071 A1* | 2/2006 | Radwin | G06Q 30/02 705/14.54 |
| 2008/0243644 A1* | 10/2008 | Bezos | G06Q 30/02 235/383 |
| 2008/0313089 A1 | 12/2008 | Du Preez | |
| 2009/0030833 A1 | 1/2009 | Leung | |
| 2009/0119187 A1 | 5/2009 | Goino | |
| 2009/0172551 A1* | 7/2009 | Kane | G06Q 30/02 715/733 |
| 2009/0271291 A1 | 10/2009 | Dreyer et al. | |
| 2011/0072360 A1 | 3/2011 | Patrick et al. | |
| 2011/0307347 A1 | 12/2011 | Jentsch | |
| 2012/0311428 A1 | 12/2012 | Goedegebuure et al. | |
| 2015/0149890 A1 | 5/2015 | Goedegebuure | |

OTHER PUBLICATIONS

"U.S. Appl. No. 13/118,785, Corrected Notice of Allowance dated Nov. 24, 2014", 12 pgs.

"U.S. Appl. No. 13/118,785, Examiner Interview Summary dated Aug. 27, 2014", 4 pgs.

"U.S. Appl. No. 13/118,785, Final Office Action dated Jun. 21, 2013", 27 pgs.

"U.S. Appl. No. 13/118,785, Non Final Office Action dated Jun. 19, 2014", 27 pgs.

"U.S. Appl. No. 13/118,785, Non Final Office Action dated Dec. 13, 2012", 23 pgs.

"U.S. Appl. No. 13/118,785, Notice of Allowance dated Oct. 9, 2014", 5 pgs.

"U.S. Appl. No. 13/118,785, Response filed Mar. 1, 2013 to Non Final Office Action dated Dec. 13, 2012", 15 pgs.

"U.S. Appl. No. 13/118,785, Response filed Aug. 19, 2013 to Final Office Action dated Jun. 21, 2013", 14 pgs.

"U.S. Appl. No. 13/118,785, Response filed Sep. 15, 2014 to Non Final Office Action dated Jun. 19, 2014", 12 pgs.

"U.S. Appl. No. 14/608,112 Response filed Sep. 19, 2016 to First Action Interview—Pre-Interview Communication dated Jul. 18, 2016", 8 pgs.

"U.S. Appl. No. 14/608,112, Examiner Interview Summary dated Sep. 26, 2016", 4 pgs.

"U.S. Appl. No. 14/608,112, First Action Interview—Pre-Interview Communication dated Jul. 18, 2016", 4 pgs.

"U.S. Appl. No. 14/608,112, Notice of Allowance dated Jan. 3, 2017", 11 pgs.

"U.S. Appl. No. 14/608,112, Preliminary Amendment filed Mar. 5, 2015", 7 pgs.

"How to Deal with Expired Product or Auction Pages", http://www.wolf-howl.com, Graywolf's SEO Bog, (Feb. 23, 2010), 3 pages.

* cited by examiner

/ 140

Greetings and welcome, web surfer from "Network A"! — 510

This item's status is expired. It is no longer available for purchase.
The webpage you requested last appeared like this before it expired:

/ 130

/ 410
"VIRGIN MARY" GRILLED CHEESE SANDWICH

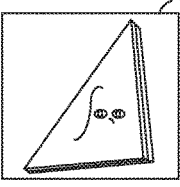
/ 420

Closing Bid Price: $27,985

Seller: chefbob
Item # XYZ-1234
430
Status: Closed
/ 440

Description: This grilled cheese sandwich has the image of the Virgin Mary on one side. Lorem ipsum dolor sit amet, consectetur adipiscing elit. Vestibulum eu tempor arcu.

Nam varius feugiat fermentum. Nullam quis mauris nulla. Nullam a purus pretium augue pharetra condimentum.

You might be interested in these similar items:

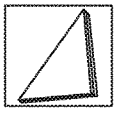
Fresh Grilled Cheese Sandwich w/ Bacon & Tomato
Current Bid Price: $7.50
Buy It Now!   Place Bid!
520

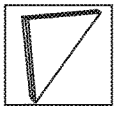
Cheese Sandwich Porcelain Sculpture by M'Beki
Sale Price: $250
Buy It Now!
530

*FIG. 5*

DOCUMENT GENERATION BASED ON REFERRAL

RELATED APPLICATIONS

This application is a continuation of U.S. patent application Ser. No. 14/608,112, filed on Jan. 28, 2015, which is a continuation of U.S. patent application Ser. No. 13/118,785, filed on May 31, 2011, each of which is hereby incorporated by reference in its entirety.

TECHNICAL FIELD

The subject matter disclosed herein generally relates to the processing of data. Specifically, the present disclosure addresses systems and methods of document generation.

BACKGROUND

A document may be requested from a machine (e.g., a server machine) belonging to a network, and the network may correspond to a domain (e.g., uspto.gov, stanford.edu, or slwip.com). The request may include a locator (e.g., a Uniform Resource Locator (URL)) of the document, and the machine may use the locator to provide the document in response to the request.

The document may describe an item, and the item may be available for purchase (e.g., from a seller of the item). For example, the product may take the form of a good (e.g., a physical object), a service (e.g., performed by a service provider), information (e.g., digital media), a license (e.g., authorization to access something), or any suitable combination thereof. An item may be a specimen (e.g., an individual instance) of a category of items, and multiple items may constitute multiple specimens of the category. For example, the category of items may represent a product of which an item is an individual specimen. Accordingly, a seller of a product may use a document to describe an item as a specimen of a product.

The seller may use a network-based system to present the item to a user of the network-based system (e.g., a potential buyer of the item). Examples of network-based systems include commerce systems (e.g., shopping websites), publication systems (e.g., classified advertisement websites), listing systems (e.g., auction websites), and transaction systems (e.g., payment websites). The item may be presented within a document (e.g., a webpage) that describes the item or product. One or more users may search the network-based system (e.g., by submitting queries) for such documents or similar information regarding details of the item or product.

BRIEF DESCRIPTION OF THE DRAWINGS

Some embodiments are illustrated by way of example and not limitation in the figures of the accompanying drawings.

FIG. 5 is a diagram illustrating the second document, which is generated based on the first document, according to some example embodiments.

DETAILED DESCRIPTION

Figure 1:
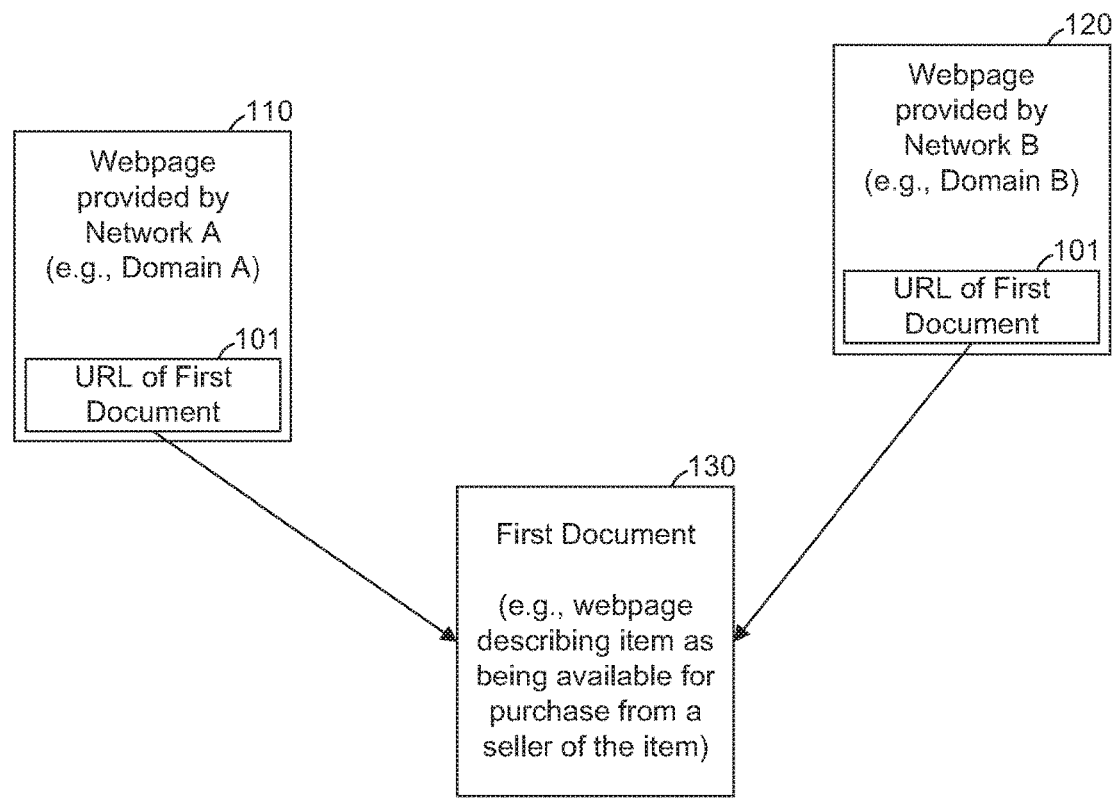
FIG. 1 is a conceptual diagram illustrating requests for provision of a first document, according to some example embodiments.

Example methods and systems are directed to document generation based on a referral. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A first document (e.g., a webpage) may be available for provision for only a limited time. While the first document is available for provision, the first document may be provided (e.g., by a server machine) in response to a request for the first document. The first document may be scheduled for unavailability (e.g., due to deletion or archival), however, and the unavailability may be scheduled to occur at a particular point in time (e.g., after expiration of a period of time, which may be predetermined or dynamically determined). After the first document is unavailable, further requests for the first document may return an error message (e.g., from the server machine). One example of such an error message is a "404" HyperText Transport Protocol (HTTP) message, which indicates that the first document is not found. Where the further requests are referred by a network (e.g., from a webpage that links to the now-unavailable first document), the returned error message may motivate the network or its operator to treat a locator of the first document as unusable (e.g., a broken link). Accordingly, the referring network or its operator may demote the first document relative to other documents still available for provision, stop referring further requests for provision of the first document, or other adverse actions regarding the first document or its contents.

A document machine, however, may detect one or more requests for provision of the first document while the first document is still available for provision. The document machine may update a count of referrals to the first document and, based on the count of referrals transgressing a threshold value, generate a second document based on the first document. This second document may be a substitute for the first document, and the second document may be provided in response to further requests for the first document after the first document is no longer available for provision. The updating of the count of referrals is based on an identifier of a network that referred a request, where the request was detected while the first document was still available for provision. As an example, the count of referrals may be used to track a number of requests referred by a particular set of networks (e.g., a particular set of one or more domains). The document machine may then provide the second document in lieu of the first document in response to a further request for provision of the first document after the first document becomes unavailable. Accordingly, error messages due to the unavailability of the first document may be avoided, and a referring network or its operator may therefore find little or no motivation to take an adverse action regarding the first document or its contents. Not every document temporarily available for provision need be treated in the manner described for the first document. In some example embodiments, only referrals from certain networks are tracked by the count of referrals (e.g., to exclude requests from web crawlers or other automated requests for provision of the first document).

FIG. 1 is a conceptual diagram illustrating requests for provision of a first document 130, according to some example embodiments. As shown, the first document 130 is available for provision. A webpage 110 is provided (e.g., to a user device) by a network (e.g., a server machine belonging to "Network A"). The webpage 110 includes a locator 101 (e.g., a URL) of the first document 130, which is available for provision (e.g., from a server machine or a document machine). Similarly, another webpage 120 is provided by another network (e.g., a server machine belonging to "Network B"). The webpage 120 also includes the locator 101 of the first document 130. The first document 130 may be a webpage, and the webpage may describe an item as being available for purchase (e.g., from a seller of the item). Accordingly, the webpages 110 and 120 contain references (e.g., locator 101) to the first document 130, and the webpages 110 and 120 may be said to be linked (e.g., hyperlinked) to the first document 130.

As shown by the arrows, the locator 101 may be used to request provision of the first document 130. For example, a mouse click on the locator 101 within the webpage 110 may initiate a request for provision of the first document 130, and the initiated request may be considered as being referred by the network ("Network A") that provided the webpage 110. Similarly, a mouse click on the locator 101 within the webpage 120 may initiate a separate request for provision of the first document 130, and that initiated request may be considered as being referred by the network ("Network B") that provided the webpage 120.

Figure 2:
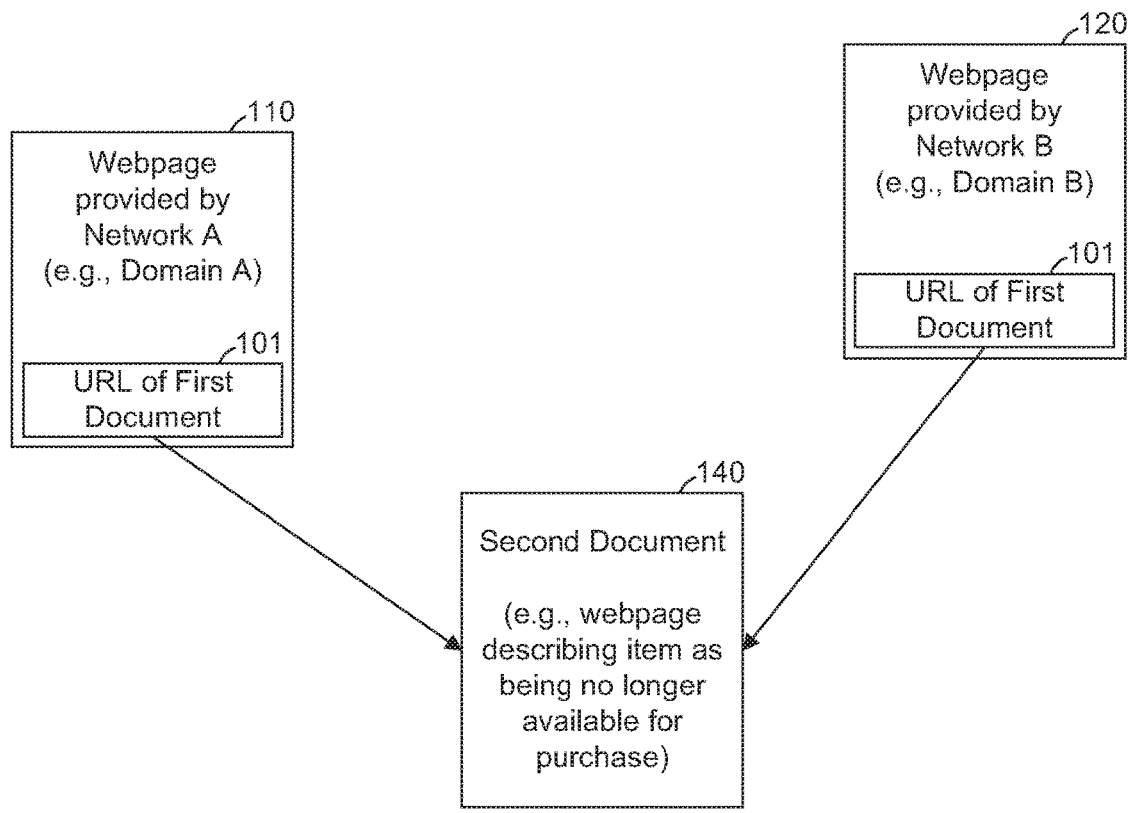
FIG. 2 is a conceptual diagram illustrating a second document being substituted for the first document with respect to further requests for provision of the first document, according to some example embodiments.

FIG. 2 is a conceptual diagram illustrating a second document 140 being substituted for the first document 130 with respect to further requests for provision of the first document 130, according to some example embodiments. As shown, the second document 140 is available for provision, while the first document 130 is not available for provision (e.g., unavailable due to being deleted, moved, renamed, password protected, expired, hidden, or archived). The second document 140 may describe the first document 130 or any portion thereof. For example, the second document 140 may be a webpage, and the webpage may describe the item that was described by the first document 130. In particular, where the first document 130 describes the item as being available for purchase, but the first document 130 is now unavailable, the second document 140 may describe the item as being no longer available for purchase. As shown by the arrows, the locator 101 may be used to initiate further requests for provision of the first document 130, and the second document 140 may be provided in lieu of the first document 130 in response to these further requests. For example, the first document 130 may be deleted, and the second document 140 may be configured to use the same locator 101 previously used for the first document 130.

Figure 3:
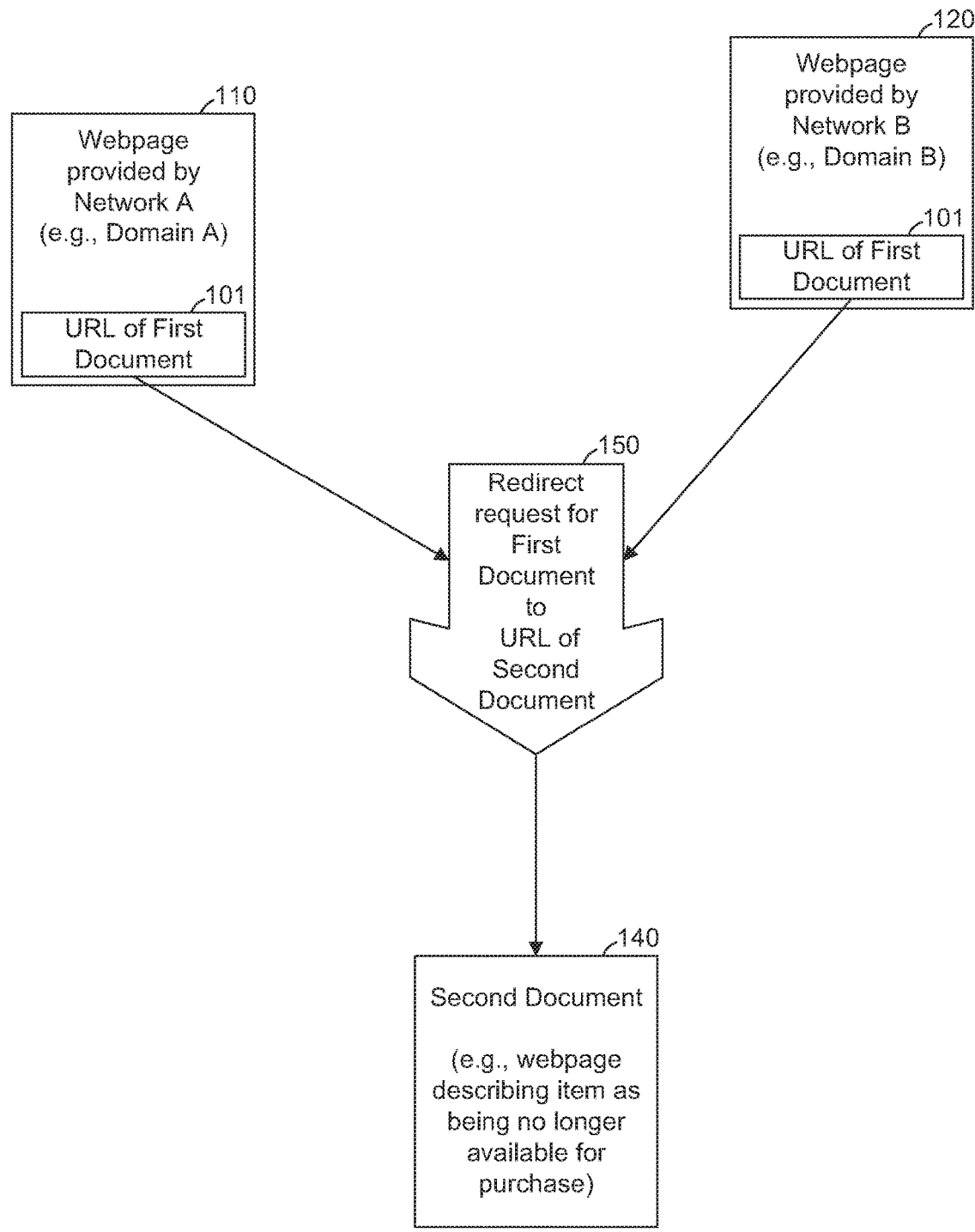
FIG. 3 is a conceptual diagram illustrating further requests for provision of the first document being redirected to a locator of the second document, according some example embodiments.

FIG. 3 is a conceptual diagram illustrating further requests for provision of the first document 130 being redirected to a locator (e.g., a URL) of the second document 140, according some example embodiments. As shown, the second document 140 is available for provision, while the first document 130 is unavailable. As shown by the arrows, the locator 101 may be used to initiate further requests for provision of the first document 130, and a redirection process 150 may redirect one or more requests for the first document 130 to the locator of the second document 140. For example, the first document 130 may be expired, and the redirection process 150 may intercept further requests for provision of the first document 130 and redirect those further requests to, instead, request provision of the second document 140. In example embodiments, this may be performed by substituting the locator of the second document 140 for the locator 101 of the first document 130 within those further requests.

Figure 4:
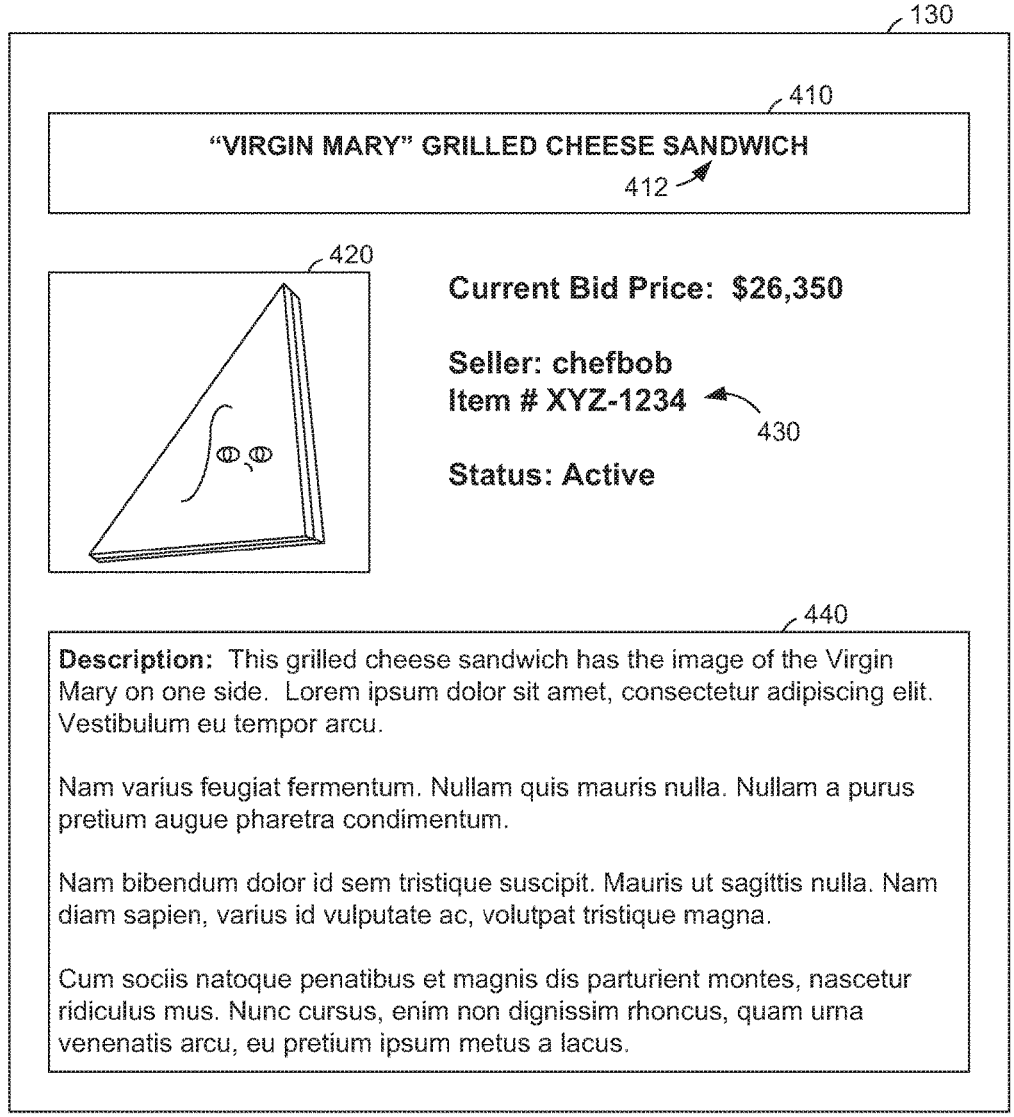
FIG. 4 is a diagram illustrating the first document, according to some example embodiments.

FIG. 4 is a diagram illustrating the first document 130, according to some example embodiments. The first document 130 may be provided (e.g., to a user device by a server machine or a document machine) in response to a request and electronically displayed (e.g., on a display screen of the user device). As shown, the first document 130 includes a title 410 (e.g., "'Virgin Mary' Grilled Cheese Sandwich") of the first document 130, an image 420 of an item (e.g., an item available for purchase from a seller), an identifier 430 of the item (e.g., as assigned to the item by a network-based commerce system), and a description 440 of the item. The title 410 may include a keyword 412 (e.g., "Sandwich"). According to various example embodiments, the keyword 412 is included in the title 410 of the item, the image 420 of the item, the identifier 430 of the item, the description 440 of the item, or any suitable combination thereof.

FIG. 5 is a diagram illustrating the second document 140, which is generated (e.g., by a document machine) based on the first document 130, according to some example embodiments. Like the first document 130, the second document 140 may be provided (e.g., to a user device by a server machine or the document machine) in response to a request (e.g., a further request for provision of the first document 130), and the second document 140 may be electronically displayed (e.g., on a display screen of the user device). As shown, the second document 140 includes a salutation 510 (e.g., "Greetings and welcome, web server from 'Network A'!"), the first document 130, and references 520 and 530 to further items. In some example embodiments, the second document 140 includes one or more portions of the first document 130, instead of the entirety of the first document 130. As shown, the second document 140 includes the title 410 of the first document 130, the image 420 of the item, the identifier 430 of the item, and some or all of the description 440 of the item.

In some example embodiments, one or more of the references 520 and 530 may be references to items that are specimens of the same category of items as the item described by the first document 130. According to various example embodiments, one or more of the references 520 and 530 may be search results obtained by searching a database of available items (e.g., items available for purchase from one or more sellers) using the keyword 412 (e.g., "Sandwich") as a search criterion. In some example embodiments, one or more of the references 520 and 530 may be recommendations of items for a particular user (e.g., of a user device displaying the second document 140), or the recommendations are generated by a recommendation engine.

Figure 6:
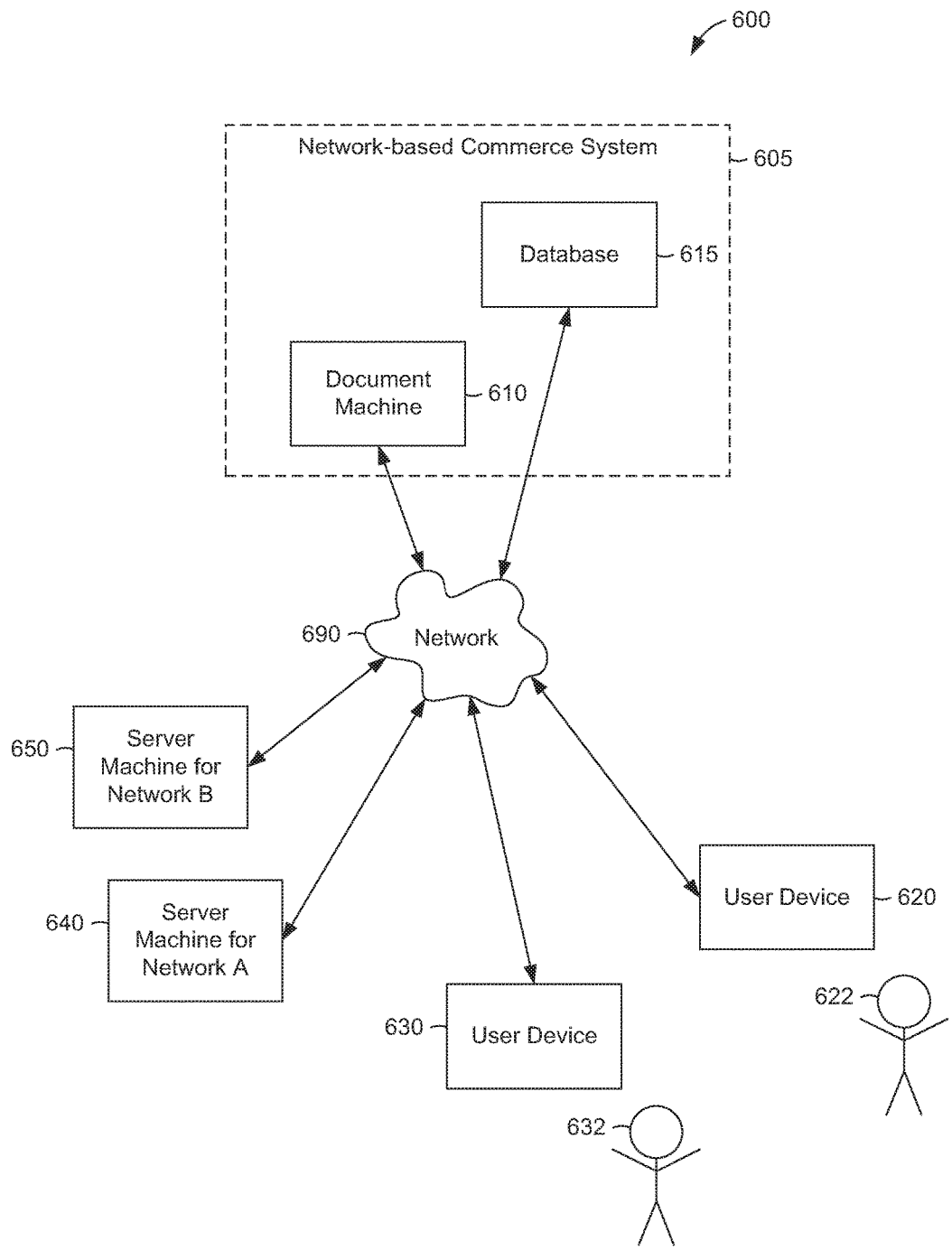
FIG. 6 is a network diagram illustrating a network environment suitable for document generation based on a referral, according to some example embodiments.

FIG. 6 is a network diagram illustrating a network environment 600 suitable for document generation based on one or more referrals, according to some example embodiments. The network environment 600 includes a document machine 610, a database 615, user devices 620 and 630, a server machine 640 belonging to a network (e.g., "Network A"), and a server machine 650 belonging to another network (e.g., "Network B"), all communicatively coupled to each other via a network 690. As shown, the document machine 610 and the database 615 may form all or part of a network-based commerce system 605 (e.g., an online electronic storefront). According to various example embodiments, the document machine 610 and the database 615 may form all or part of a network-based system that is not a network-based commerce system. The document machine may be implemented in a computer system, as described below with respect to FIG. 12.

The database 615 is a data repository that stores information pertinent to the document machine 610, the network-based commerce system 605, or both. Further example details of the database 615 are discussed below with respect to FIG. 8.

Each of the server machines 640 and 650 may be configured as a web server for a network (e.g., a domain). For example, the server machine 640 may provide the user device 620 with the webpage 110, and the server machine 650 may provide the user device 620 with the webpage 120. Where the webpage 110 is used to initiate a request for provision of the first document 130, the network of the server machine 640 (e.g., "Network A") may be deemed as the referring network for that request. Similarly, where the webpage 120 is used to initiate a request for provision of the first document 130, the network of the server machine 650 (e.g., "Network B") may be deemed as the referring network for that request.

Also shown in FIG. 6 are users 622 and 632. One or both of the users 622 and 632 may be a human user (e.g., a human being), a machine user (e.g., a software program configured to interact with a user device), or any suitable combination thereof (e.g., a human assisted by a machine). The user 622 is not part of the network environment 600, but is associated with the user device 620 and may be a user of the user device 620. For example, the user device 620 may be a deskside computer, a tablet computer, or a smart phone belonging to the user 622. Similarly, the user 632 is not part of the network environment 600, but is associated with the user device 630. As an example, the user device 630 may be a tablet computer belonging to the user 632.

Any of the machines, databases, or devices shown in FIG. 6 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 12. As used herein, a "database" is a data storage resource and may store data structured as a text file, a table, a spreadsheet, a relational database, a triple store, or any suitable combination thereof. Moreover, any two or more of the machines illustrated in FIG. 6 may be combined into a single machine, and the functions described herein for any single machine may be subdivided among multiple machines.

The network 690 may be any network that enables communication between machines (e.g., document machine 610 and the user device 620). Accordingly, the network 690 may be a wired network, a wireless network, or any suitable combination thereof. The network 690 may include one or more portions that constitute a private network, a public network (e.g., the Internet), or any suitable combination thereof.

Figure 7:
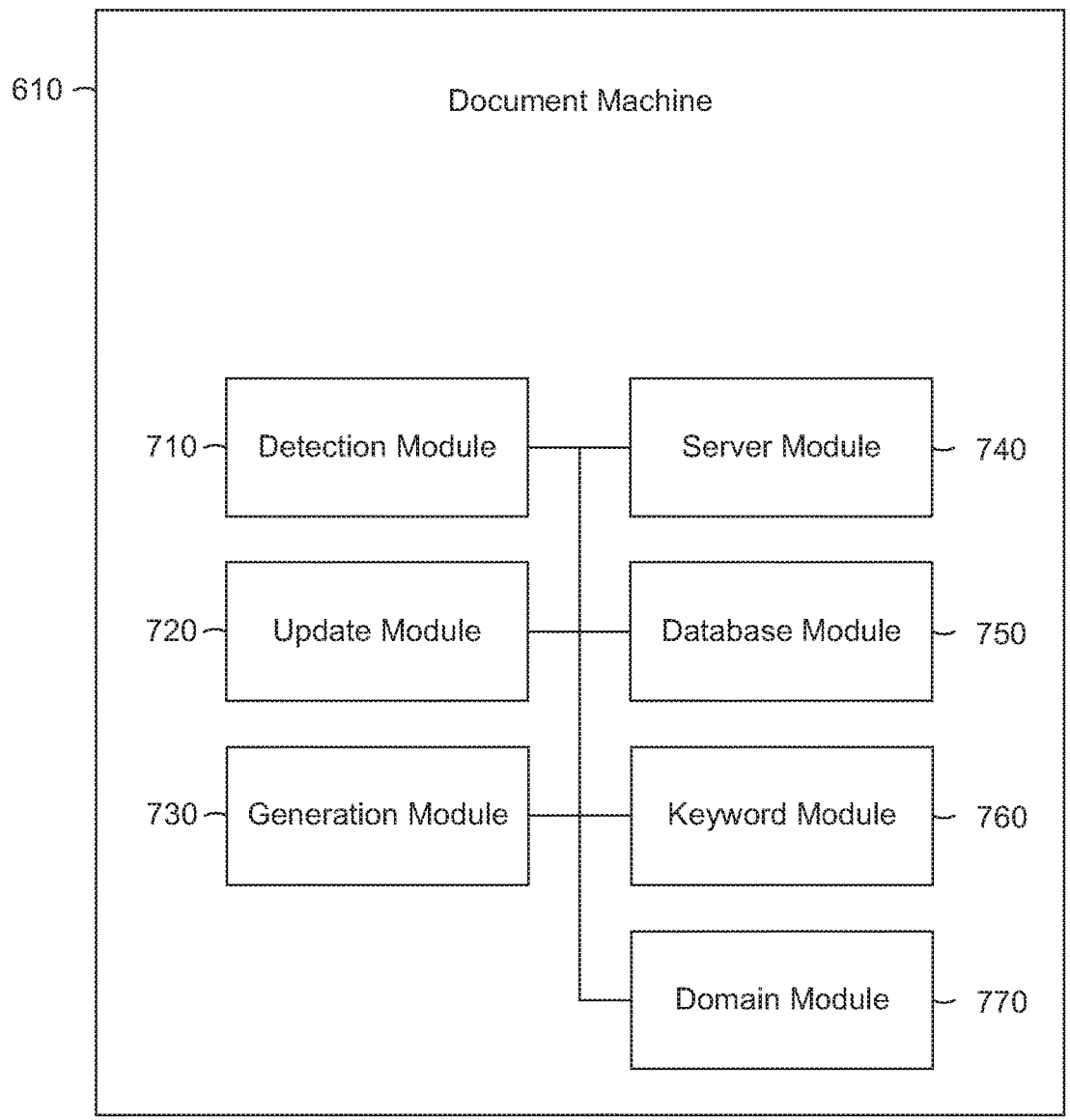
FIG. 7 is a block diagram illustrating components of a document machine configured for document generation based on a referral, according to some example embodiments.

FIG. 7 is a block diagram illustrating components of the document machine 610, according to some example embodiments. The document machine 610 includes a detection module 710, an update module 720, a generation module 730, a server module 740, a database module 750, a keyword module 760, and a domain module 770, all configured to communicate with each other (e.g., via a bus, shared memory, or a switch). Any one or more of the modules described herein may be implemented using hardware (e.g., a processor of a machine) or a combination of hardware and software. Moreover, any two or more of these modules may be combined into a single module, and the functions described herein for a single module may be subdivided among multiple modules.

The detection module 710 is configured to detect (e.g., receive) one or more requests for provision of the first document 130. The detection module 710 may detect a request during a period of time in which the first document 130 is available for provision (e.g., a predetermined period of time of availability). For example, the detection module 710 may detect the request at a time when the first document 130 is not deleted, moved, renamed, password protected, expired, hidden, archived, or any suitable combination thereof. The request detected by the detection module 710 may include an identifier of a network that referred the request (e.g., an Internet protocol (IP) address or domain name for "Network A").

The detection module 710 is further to detect (e.g., receive) one or more further requests for provision of the first document 130. These further requests may be detected at a time when the first document 130 is unavailable for provision (e.g., a time subsequent to a predetermined period of time of availability). As an example, the detection module 710 may detect a further request for provision of the first document 130 after the first document has been deleted, moved, renamed, password protected, expired, hidden, archived, or any suitable combination thereof. According to various example embodiments, the detection module 710 may detect a further request by receiving the further request from a user device (e.g., user device 620) that communicates with the network that referred the further request.

The update module 720 is configured to update a count of referrals to the first document 130. The count of referrals may represent a number of requests detected (e.g., by detection module 710), where the detected requests were referred by one or more server machines (e.g., server machine 640) of one or more networks (e.g., "Network A"). The count of referrals may aggregate a number of referrals from a single network or from a set of multiple networks, and the set of multiple networks may be a subset of all networks that referred a request for provision of the first document 130. In other words, according to some example embodiments, the count of referrals may track only referrals from certain (e.g., predetermined) networks.

The generation module 730 is configured to generate the second document 140 based on the first document 130 in response to the count of referrals (e.g., as updated by the update module 720) transgressing a threshold value for the count of referrals (e.g., a predetermined threshold value). As noted above, the second document 140 may be generated as a substitute for the first document 130. In particular, the second document 140 may be a substitute for the first document 130 subsequent to expiration of a predetermined time of availability (e.g., in which the first document 130 is available for provision).

In some example embodiments, the server module 740 is configured to provide the second document 140 in lieu of the first document 130 in response to a further request for provision of the first document 130 (e.g., as detected by the detection module 710). For example, the server module 740 may provide the second document 140 to a user device (e.g., user device 620) in lieu of the first document 130 when the first document 130 is unavailable, where the user device functions as a client device with respect to the document machine 610.

In certain example embodiments, the server module 740 is configured to redirect a further request for provision of the first document 130 (e.g., as detected by the detection module 710). The redirection of the further request may be based on the locator of the second document 140 (e.g., a URL of the second document 140). For example, when the first document 130 is unavailable, the server module 740 may redirect a request for provision the first document 130 to a URL of the second document 140.

The database module 750 is configured to access the database 615 and information stored therein. Information that may be stored by the database 615 is discussed below with respect to FIG. 8.

The keyword module 760 is configured to identify a keyword (e.g., keyword 412) included in the first document 130 and obtain search results by executing a search of a database (e.g., database 615) with the keyword as a search criterion. For example, the keyword module 760 may extract the keyword 412 from the first document and use the keyword 412 as a search criterion in performing a search of the database 615. One or more of the search results obtained by performing the search may be inserted (e.g., by the generation module 730) into the second document 140 (e.g., as references 520 and 530).

The domain module 770 is configured to determine that an identifier of the network that referred a particular request (e.g., as detected by the detection module 710) is absent from a list of excluded networks. This determination may be communicated by the domain module 770 to the update module 720, which may update a count of referrals in response to this determination.

Figure 8:
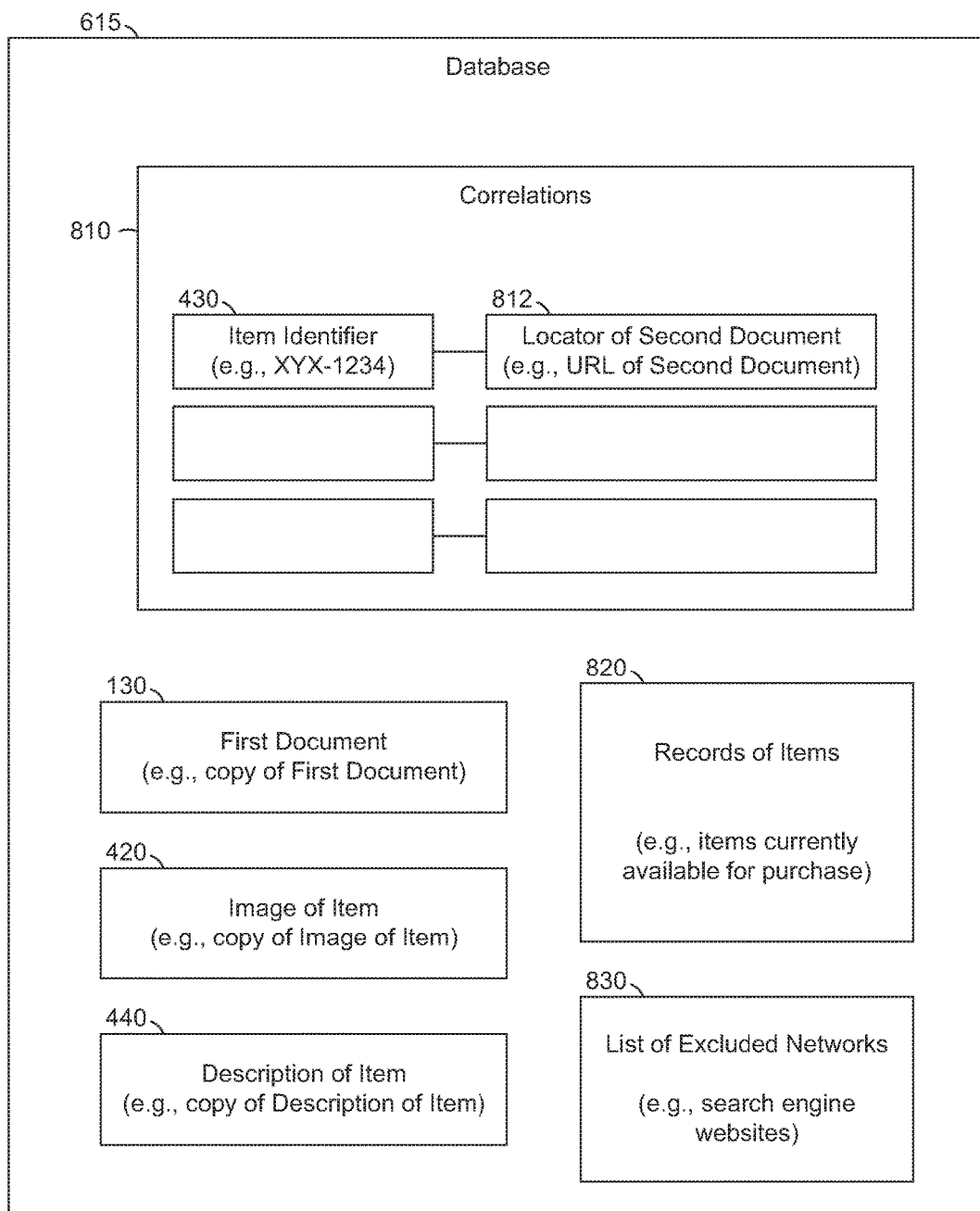
FIG. 8 is a block diagram illustrating a database configured to facilitate document generation based on a referral, according to some example embodiments.

FIG. 8 is a block diagram illustrating information stored in the database 615, according to some example embodiments. The database 615 includes correlations 810 that map an item identifier 430 (e.g., "XYZ-1234") to a corresponding locator 812 (e.g., URL) of the second document 140. The correlations 810 may include mappings of one or more pairs of item identifiers (e.g., item identifier 430) and their corresponding locators (e.g., locator 812). When accessed, a correlation among the correlations 810 may be used (e.g., by the server module 740) to identify a locator from its corresponding item identifier and redirect a request based on the identified locator.

The database 615 further includes the first document 130, the image 420 of the item, the description 440 of the item, or copies thereof. The database 615 also includes records 820 of items (e.g., records of items currently available for purchase, records of items currently unavailable for purchase, or both), and a list 830 of excluded networks (e.g., excluded IP addresses or excluded domain names). For example, the list 830 may include an identifier for a network that provides a search engine website from which referred requests are to be excluded (e.g., by the update module 720) in updating a count of referrals to the first document 130.

Figure 9:
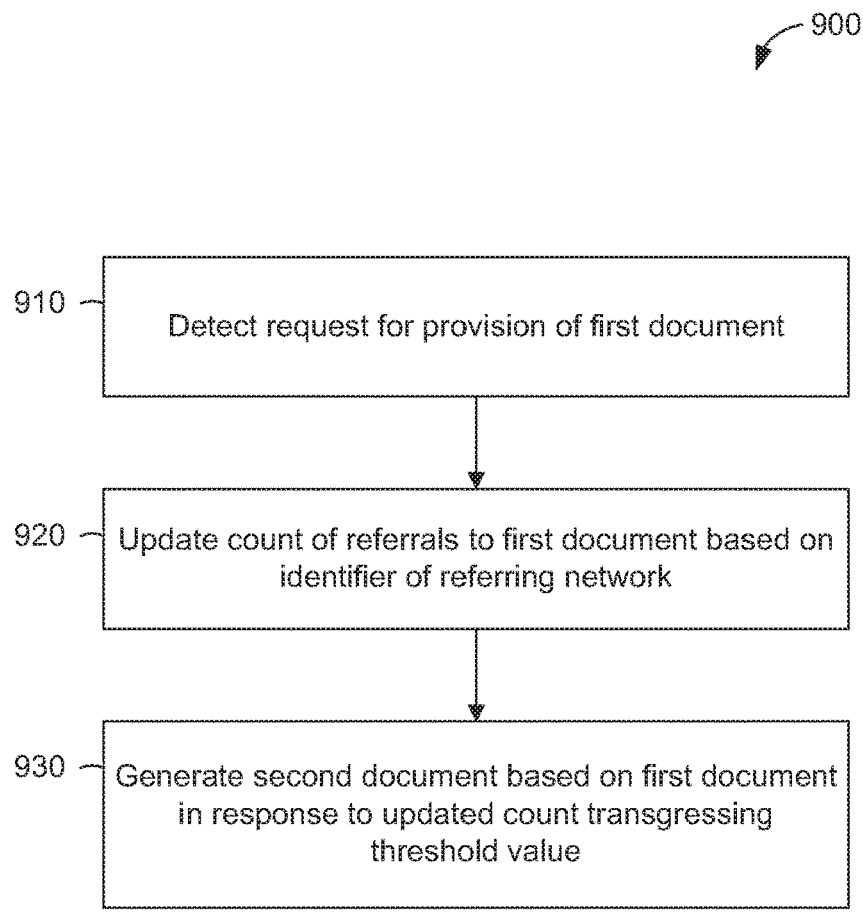
FIG. 9-11 are flowcharts illustrating operations in a method of document generation based on a referral, according some example embodiments.
Figure 10:
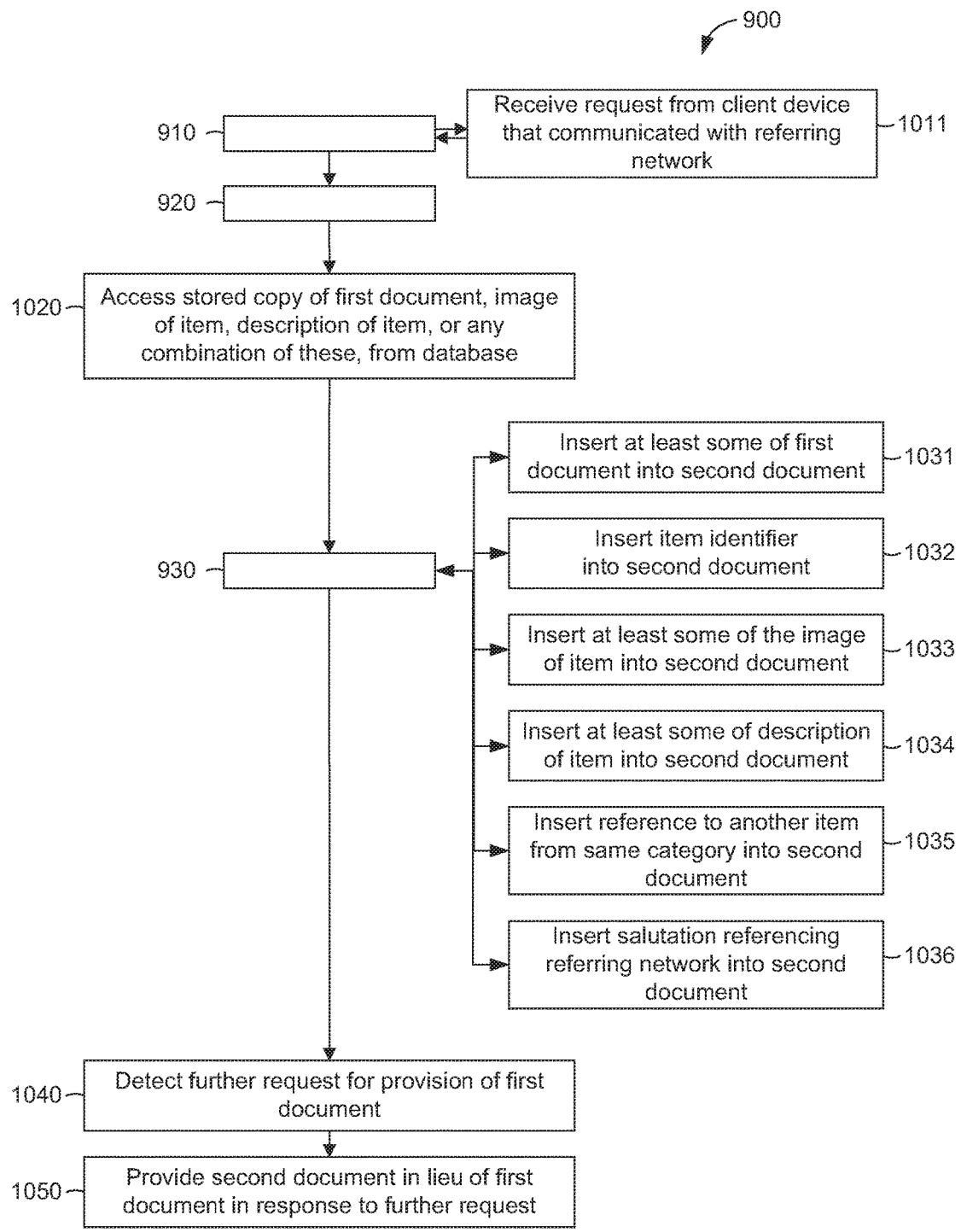
Figure 11:
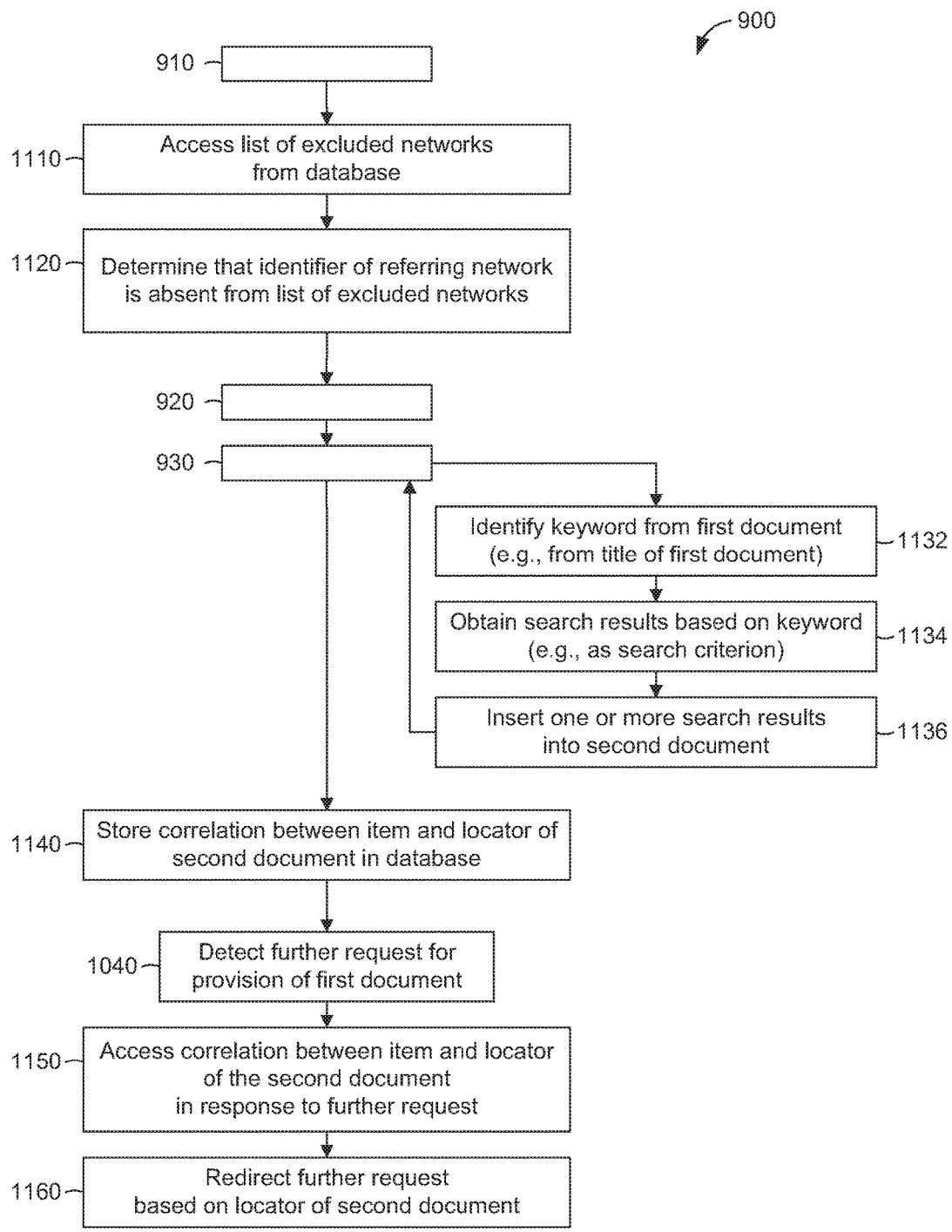

FIG. 9-11 are flowcharts illustrating operations in a method 900 of document generation based on a referral, according some example embodiments. Operations in the method 900 may be performed by the document machine 610, using modules described above with respect to FIG. 7.

As shown in FIG. 9, the method 900 includes operations 910, 920, and 930. In operation 910, the detection module 710 detects a request for provision of the first document 130. For example, the detection module 710 may detect the request as being sent from the user device 620. As noted above, the request may include an identifier of a network that referred the request (e.g., an IP address or domain name for "Network A"), and the first document 130 may be available for provision at this time. For example, the first document 130 may be available for provision only during a predetermined period of time of availability for the first document 130.

In operation 920, the update module 720 updates a count of referrals to the first document 130. The count of referrals may be updated based on the identifier of the network that referred the request (e.g., the IP address or domain name for "Network A").

In operation 930, the generation module 730 generates the second document 140 based on the first document 130. The generating of the second document 140 may be responsive to the updated count of referrals transgressing a threshold value for the count of referrals. As noted above, the second document 140 may be a substitute for the first document 130 subsequent to expiration of the predetermined period of time of availability for the first document 130. According to some example embodiments, operation 930 may be performed during a period of time (e.g., a predetermined period of time) in which the first document 130 is available for provision. For example, the first document 130 may be scheduled for unavailability starting on a particular date, and operation 930 may be performed prior to that particular date. As another example, the first document 130 may initially describe an item as being available for purchase (e.g., item status being "open," "active," or "for sale") and later describe the item is no longer available for purchase (e.g., item status being "closed," "inactive," or "sold"), and operation 930 may be performed based on the item being no longer available (e.g., item status being "closed," "inactive," or "sold"). Although the item may be unavailable, the first document 130 may be available for provision for a predetermined period of time thereafter. Later, after expiration of a predetermined period of time (e.g., 90 days), the first document 130 may be deleted (e.g., item status being "expired," "removed," or "archived"), hence rendering the first document 130 unavailable for provision, in which case the second document 140 may be available for provision in lieu of the first document 130.

As shown in FIG. 10, the method 900 may include one or more of operations 1011, 1020, 1031-1036, 1040, and 1050. Operation 1011 may be performed by the detection module 710 as part (e.g., a precursor task, a subroutine, or a portion) of operation 910, in which the request for provision of the first document 130 is detected. In operation 1011, the detection module 710 receives the request for provision of the first document 130. The detection module 710 may receive the request from a user device (e.g., user device 620) that communicated with a network that referred the request. For example, the detection module 710 may receive the request from the user device 620 via the network 690. In this example, the request is referred to the document machine 610 by the server machine 640 for "Network A" after providing the webpage 110 to the user device 620 and detecting a click on a hyperlink that references the locator 101 of the first document 130. Accordingly, in this example, "Network A" is the referring network for the request.

In operation 1020, the database module 750 accesses the database 615 for information usable by the generation module 730 in performance of operation 930. For example, the database module 750 may access some or all of the first document 130 (e.g., a copy of the first document 130), some or all of the title 410 of the first document 130, some or all of the image 420 of the item (e.g., a copy of the image 420 of the item), some or all of the item identifier 430, some or all of the description 440 of the item (e.g., a copy of the description 440 of the item), or any suitable combination thereof.

Any one or more of operations 1031-1036 may be performed by the generation module 730 as part (e.g., a precursor task, a subroutine, or a portion) of operation 930, in which the second document 140 is generated. In operation 1031, the generation module 730 inserts at least some of the first document 130 into the second document 140. For example, the generation module 730 may insert the entirety of the first document 130 or a portion of the first document 130 (e.g., a cropped screenshot of the first document 130) into the second document 140.

In operation 1032, the generation module 730 inserts at least some of the item identifier 430 into the second document 140. As an example, the generation module 730 may insert the entirety of the item identifier 430 or a portion of the item identifier 430 (e.g., a truncated portion of the item identifier 430) into the second document 140.

In operation 1033, the generation module 730 inserts at least some of the image 420 of the item into the second document 140. For example, the generation module 730 may insert the entirety of the image 420 or a portion of the image 420 (e.g., a cropped or thumbnail version of the image 420) into the second document 140.

In operation 1034, the generation module 730 inserts at least some of the description 440 of the item into the second document 140. For example, the generation module 730 may insert the entirety of the description 440 or a portion of the description 440 (e.g., a truncated version of the description 440) into the second document 140.

In operation 1035, the generation module 730 inserts one or more references (e.g., references 520 and 530) to further items from the same category as the item into the second document 140. For example, the generation module 730 may insert the reference 520 as a reference to another item belonging to a category for "Sandwiches" into the second document 140.

In operation 1036, the generation module 730 inserts a salutation (e.g., salutation 510) that references the network (e.g., "Network A") that referred the request into the second document 140. For example, the generation module 730 may generate the salutation 510 based on a network identifier (e.g., IP address or the domain name) included in the request and insert the generated salutation 510 into the second document 140.

In operation 1040, the detection module 710 detects a further request for provision of the first document 130. For example, the detection module may detect the request is being sent from the user device 630. The first document 130 may be unavailable for provision at this time, however. As an example, the further request may be detected subsequent to a predetermined period of time of availability for the first document 130.

In operation 1050, the server module 740 provides the second document 140 in lieu of the first document 130 in response to the further request detected in operation 1040. According to certain example embodiments, the locator 101 of the first document 130 matches the locator 812 of the second document 140. For example, the locator 101 and the locator 812 may be the same URL. In alternative example embodiments, however, the locator 101 of the first document 130 is different from the locator 812 of the second document 140. As an example, the locator 101 may be a particular URL, while the locator 812 is a different URL, and the server module 740 is configured to translate the particular URL to the different URL (e.g., prior to or as part of providing the second document 140 in lieu of the first document 130).

As shown in FIG. 11, the method 900 may include one or more of operations 1110, 1120, 1132-1136, 1140, 1150, and 1160. In operation 1110, the database module 750 accesses the list 830 of excluded networks from the database 615. In some example embodiments, the list 830 of excluded networks includes one or more identifiers of networks that provide search engine services (e.g., networks hosting websites that provide search engine services). For example, the list 830 of excluded networks may contain one or more domain names corresponding to well-known search engines (e.g., google.com). This may have the effect of excluding requests that result from web crawling activities performed by one or more search engines, which may be helpful in situations where the count of referrals to the first document 130 is treated as being indicative of the popularity of the first document 130 among human users.

In operation 1120, the domain module 770 compares the identifier of the network that referred the request detected in operation 910 (e.g., an IP address or domain name of "Network A") with the list 830 accessed in operation 1110. According to some example embodiments, the domain module 770 determines that the identifier of the referring network is absent from the list 830 of excluded networks. The update module 720 may perform operation 920 based on this determination.

Any one or more of operations 1132-1136 may be performed as part (e.g., a precursor task, a subroutine, or a portion) of operation 930, in which the second document 140 is generated. In operation 1132, the keyword module 760 identifies a keyword (e.g., keyword 412) from the first document 130. For example, the keyword module 760 may parse the first document 130 and extract one or more keywords from the first document 130.

In operation 1134, the keyword module 760 obtains search results based on the keyword identified in operation 1132. The keyword module 760 may use one or more identified keywords as search criteria in performing a search of a database (e.g., database 615). As an example, the keyword module 760 may access the records 820 of items stored in the database 615 and perform a search of the records 820 to obtain search results, where the search results may include one or more individual records found among the records 820 of items.

In operation 1136, the generation module 730 inserts one or more of the search results obtained in operation 1134 into the second document 140 (e.g., as part of generating the second document 140). A search result may be inserted into the second document 140 as a reference (e.g., reference 520) to an item. As noted above, the item may be currently available for purchase. Accordingly, a search result, a reference to a search result, a reference to an item represented by a search result, or any combination thereof, may be inserted into the second document 140 in operation 1136.

In operation 1140, the database module 750 stores a correlation between an item identifier and a locator. The database module 750 may store a correlation between an item identifier (e.g., item identifier 430) and a locator (e.g., locator 812) of a document (e.g., second document 140). The correlation may be stored as one of the correlations 810 within the database 615. Accordingly, this correlation may function as a data structure that maps an item (e.g., as identified by the item identifier 430) to a generated document (e.g., second document 140) that is available after a different document (e.g., first document 130) becomes unavailable for provision.

FIG. 11 shows operation 1040, in which a further request for provision of the first document 130 is detected. As noted above, the further request may be detected at a time when the first document 130 is unavailable (e.g., at a time subsequent to expiration of a predetermined period of availability for the first document 130).

In operation 1150, the database module 750 accesses the stored correlation (e.g., among the correlations 810) between the item identifier 430 and the locator 812 of the second document 140. The accessing of the stored correlation may be performed in response to the further request detected in operation 1040.

In operation 1160, the server module 740 redirects the further request based on the locator 812 of the second document 140. The server module 740 may perform operation 1160 by executing the redirection process 150 discussed above with respect to FIG. 3. Operation 1160 may be performed in response to the further request detected in operation 1040.

According to various example embodiments, one or more of the methodologies described herein may facilitate communication of information previously available but no longer available for provision. This may have the effect of avoiding, minimizing, or mitigating errors resulting from broken hyperlinks after a previously available document is no longer available. In particular, one or more the methodologies discussed herein may be used to determine whether to generate a substitute document (e.g., second document 140) for a previously available document (e.g., first document 130) about an item previously available for purchase from a seller. One or more of the methodologies described herein may constitute all or part of a business method (e.g., a business method implemented using a machine) that presents one or more users with a document describing the unavailable item, potentially with suggested or recommended alternative items that are currently available.

When these effects are considered in aggregate, one or more of the methodologies described herein may obviate a need for certain efforts or resources that otherwise would be involved in matching users (e.g., as potential purchasers) with currently available products or specimens thereof that are likely to be of interest. Efforts expended by a user in identifying a currently available product for purchase may be reduced by one or more of the methodologies described herein. Computing resources used by one or more machines, databases, or devices (e.g., within the network environment 600) may similarly be reduced. Examples of such computing resources include processor cycles, network traffic, memory usage, data storage capacity, power consumption, and cooling capacity.

Figure 12:
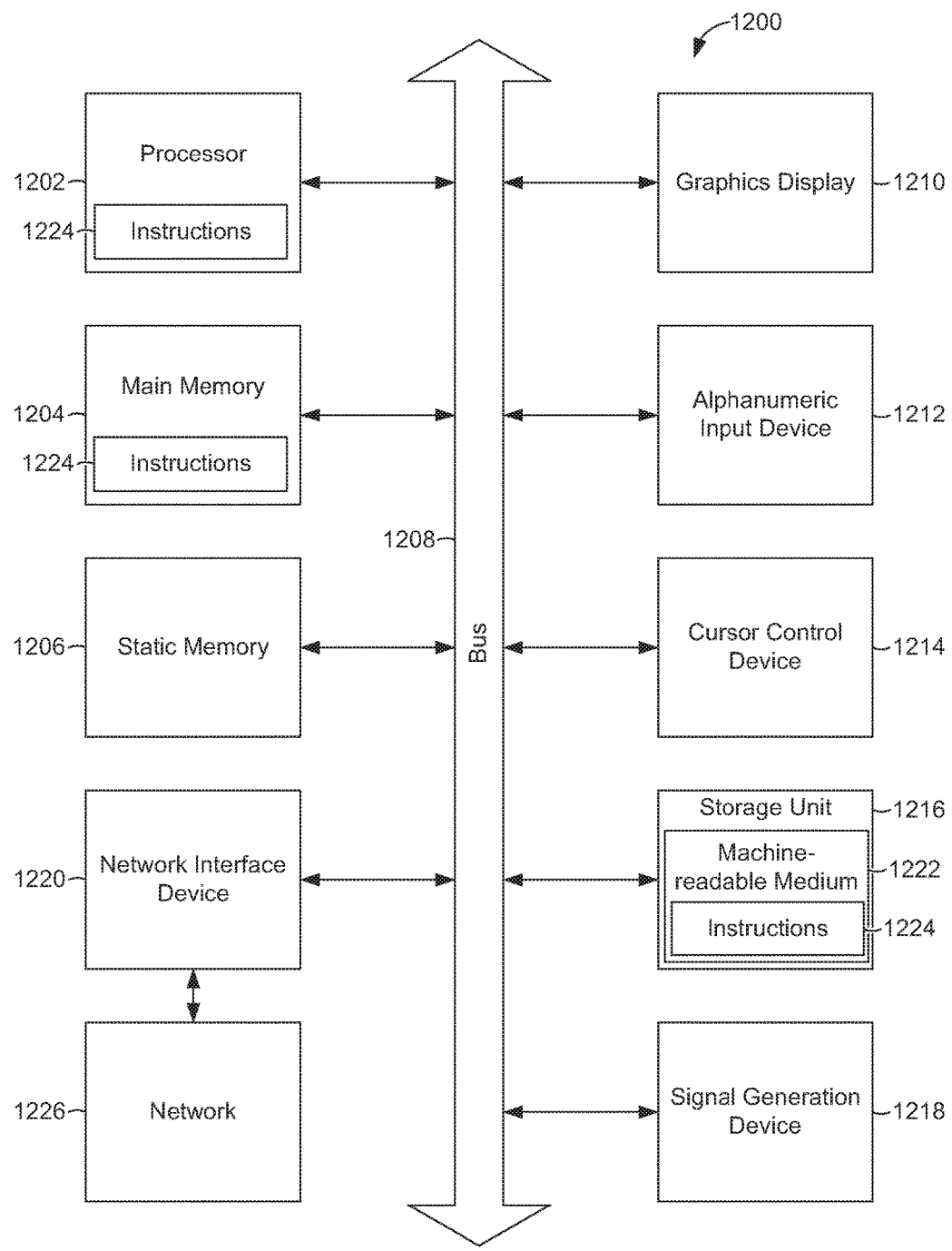
FIG. 12 is a block diagram illustrating components of a machine, according to some example embodiments, able to read instructions from a machine-readable medium and perform any one or more of the methodologies discussed herein.

FIG. 12 illustrates components of a machine 1200, according to some example embodiments, that is able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system and within which instructions 1224 (e.g., software) for causing the machine 1200 to perform any one or more of the methodologies discussed herein may be executed. In alternative embodiments, the machine 1200 operates as a stand-alone device or may be connected (e.g., networked) to other machines. In a networked deployment, the machine 1200 may operate in the capacity of a server machine or a client machine in a server-client network environment, or as a peer machine in a peer-to-peer (or distributed) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224 (sequentially or otherwise) that specify actions to be taken by that machine. Further, while only a single machine is illustrated, the term "machine" shall also be taken to include a collection of machines that individually or jointly execute the instructions 1224 to perform any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a liquid crystal display (LCD), a projector, or a cathode ray tube (CRT)). The machine 1200 may also include an alphanumeric input device 1212 (e.g., a keyboard), a cursor control device 1214 (e.g., a mouse, a touchpad, a trackball, a joystick, a motion sensor, or other pointing instrument), a storage unit 1216, a signal generation device 1218 (e.g., a speaker), and a network interface device 1220.

The storage unit 1216 includes a machine-readable medium 1222 on which is stored the instructions 1224 (e.g., software) embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1226 (e.g., network 690) via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., software) for execution by the machine, such that the instructions, when executed by one or more processors of the machine (e.g., processor 1202), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   detecting, by one or more processors of a machine, a request for provision of a first document that is available for provision;
   updating a count of referrals based on determining the request was sent from a set of one or more networks, the count of referrals comprising a number of requests for provision of the first document received from the set of one or more networks;
   retrieving a second document based on the first document and on the count of referrals transgressing a threshold value; and
   providing the second document in response to a subsequent request for the first document, the subsequent request occurring after expiration of an availability of the first document.

2. The method of claim 1, further comprising redirecting the subsequent request from the first document to the second document.

3. The method of claim 2, wherein redirecting the subsequent request further comprises:
   identifying a first locator for the first document within the subsequent request;
   substituting a second locator for the second document within the subsequent request; and
   transmitting the subsequent request to the second locator.

4. The method of claim 2, wherein redirecting the subsequent request further comprises:
   determining the first document is unavailable for provision; and
   determining the second document is a substitute for the first document.

5. The method of claim 1, further comprising:
   generating the second document from the first document and including at least a portion of the first document in the second document.

6. The method of claim 1, further comprising:
   identifying a plurality of references based on the first document, the plurality of references associated with documents that are similar to the first document; and
   providing one or more of the plurality of references within the second document.

7. The method of claim 1, further comprising:
   determining a different request for provision of the first document is received from a web crawling operation of a search engine, the search engine excluded from the set of one or more networks; and
   excluding the different request for provision from updating the count of referrals for the first document.

8. A system comprising:
   one or more processors; and
   a non-transitory machine-readable storage medium coupled to the one or more processors, the non-transitory machine-readable storage medium comprising instructions that, when executed by the one or more processors, implement operations comprising:
   detecting a request for provision of a first document that is available for provision,
   updating a count of referrals based on determining the request was sent from a set of one or more networks, the count of referrals comprising a number of requests for provision of the first document,
   retrieving a second document based on the first document and on the count of referrals transgressing a threshold value, and
   providing the second document in response to a subsequent request for the first document, the subsequent request occurring after expiration of an availability of the first document.

9. The system of claim 8, wherein the operations further comprise redirecting the subsequent request from the first document to the second document.

10. The system of claim 9, wherein redirecting the subsequent request further comprises:
    identifying a first locator for the first document within the subsequent request;
    substituting a second locator for the second document within the subsequent request; and
    transmitting the subsequent request to the second locator.

11. The system of claim 9, wherein redirecting the subsequent request further comprises:
    determining the first document is unavailable for provision; and
    determining the second document is a substitute for the first document.

12. The system of claim 8 wherein the operations further comprise:
    generating the second document from the first document and including at least a portion of the first document in the second document.

13. The system of claim 8, wherein the operations further comprise:
    identifying a plurality of references based on the first document, the plurality of references associated with documents that are similar to the first document; and
    providing one or more of the plurality of references within the second document.

14. The system of claim 8, wherein the operations further comprise:

determining a different request for provision of the first document is received from a web crawling operation of a search engine, the search engine excluded from the set of one or more networks; and excluding the different request for provision from updating the count of referrals for the first document.

15. A non-transitory machine-readable storage medium comprising instructions that, when executed by one or more processors of a machine, cause the machine to perform operations comprising:

detecting a request for provision of a first document that is available for provision;

updating a count of referrals based on determining the request was sent from a set of one or more networks, the count of referrals comprising a number of requests for provision of the first document;

retrieving a second document based on the first document and on the count of referrals transgressing a threshold value; and providing the second document in response to a subsequent request for the first document, the subsequent request occurring after expiration of an availability of the first document.

16. The non-transitory machine-readable storage medium of claim 15, wherein the operations further comprise redirecting the subsequent request from the first document to the second document.

17. The non-transitory machine-readable storage medium of claim 16, wherein redirecting the subsequent request for provision further comprises:

identifying a first locator for the first document within the subsequent request;

substituting a second locator for the second document within the subsequent request; and transmitting the subsequent request to the second locator.

18. The non-transitory machine-readable storage medium of claim 16, wherein redirecting the request further comprises:

determining the first document is unavailable for provision; and determining the second document is a substitute for the first document.

19. The non-transitory machine-readable storage medium of claim 15, wherein the operations further comprise:

identifying a plurality of references based on the first document, the plurality of references associated with documents that are similar to the first document; and providing one or more of the plurality of references within the second document.

20. The non-transitory machine-readable storage medium of claim 15, wherein the operations further comprise:

determining a different request for provision of the first document is received from a web crawling operation of a search engine, the search engine excluded from the set of one or more networks; and excluding the different request for provision from updating the count of referrals for the first document.

* * * * *

UNITED STATES PATENT AND TRADEMARK OFFICE
CERTIFICATE OF CORRECTION

PATENT NO. : 10,120,849 B2
APPLICATION NO. : 15/497566
DATED : November 6, 2018
INVENTOR(S) : Dennis Goedegebuure Page 1 of 1

It is certified that error appears in the above-identified patent and that said Letters Patent is hereby corrected as shown below:

In the Claims

In Column 18, Line 7, Claim 18, after "request" insert -- for provision --.

Signed and Sealed this
Twelfth Day of February, 2019

Andrei Iancu
*Director of the United States Patent and Trademark Office*